United States Patent

Altnether et al.

[11] Patent Number: 4,897,926
[45] Date of Patent: Feb. 6, 1990

[54] VEHICLE WHEEL TURNING ANGLE GAUGE

[75] Inventors: Paul J. Altnether; Timothy A. Strege, both of St. Louis County, Mo.

[73] Assignee: Hunter Engineering Company, Bridgeton, Mo.

[21] Appl. No.: 244,040

[22] Filed: Sep. 14, 1988

[51] Int. Cl.[4] .............................. G01B 11/275
[52] U.S. Cl. ..................... 33/203.14; 33/203.12
[58] Field of Search ........... 33/203.12, 203.14, 203.13, 33/1 PT

[56] References Cited

U.S. PATENT DOCUMENTS

| | | | |
|---|---|---|---|
| 2,135,195 | 11/1938 | Morse et al. | 33/203.12 |
| 2,346,360 | 4/1944 | Creagmile | 33/203.12 |
| 3,231,983 | 2/1966 | Bender | 33/203.12 |
| 3,905,120 | 9/1975 | Butler | 33/203.14 |
| 4,167,816 | 9/1979 | Jarman et al. | 33/203.12 |
| 4,394,768 | 7/1983 | Beissmarth | 33/203.14 |
| 4,443,951 | 4/1984 | Elsasser et al. | 33/203.13 |
| 4,495,700 | 1/1985 | Ernst | 33/1 PT |
| 4,625,411 | 12/1986 | Kashiwaoi et al. | 33/1 PT |

FOREIGN PATENT DOCUMENTS

| | | | |
|---|---|---|---|
| 0305237 | 3/1989 | European Pat. Off. | 33/336 |
| 0112206 | 6/1984 | Japan | 33/203.12 |
| 0007316 | 1/1985 | Japan | 33/203.12 |
| 0013106 | 1/1986 | Japan | 33/203.12 |
| 0200422 | 9/1986 | Japan | 33/203.12 |

Primary Examiner—William A. Cuchlinski, Jr.
Assistant Examiner—Thomas B. Will
Attorney, Agent, or Firm—Gravely, Lieder & Woodruff

[57] ABSTRACT

A vehicle wheel turning angle gauge having a base to support a wheel engaging turnable plate which supports an optical encoder device mounted in non-rotary position so an operating shaft can engage and turn with the turnable plate to generate signals of the degree of turn and the direction of that turn. The base provides a structure for limiting the maximum displacement of the turnable plate without restricting its direction of motion so it will accommodate the range of vehicle wheel movement as required for alignment purposes.

2 Claims, 3 Drawing Sheets

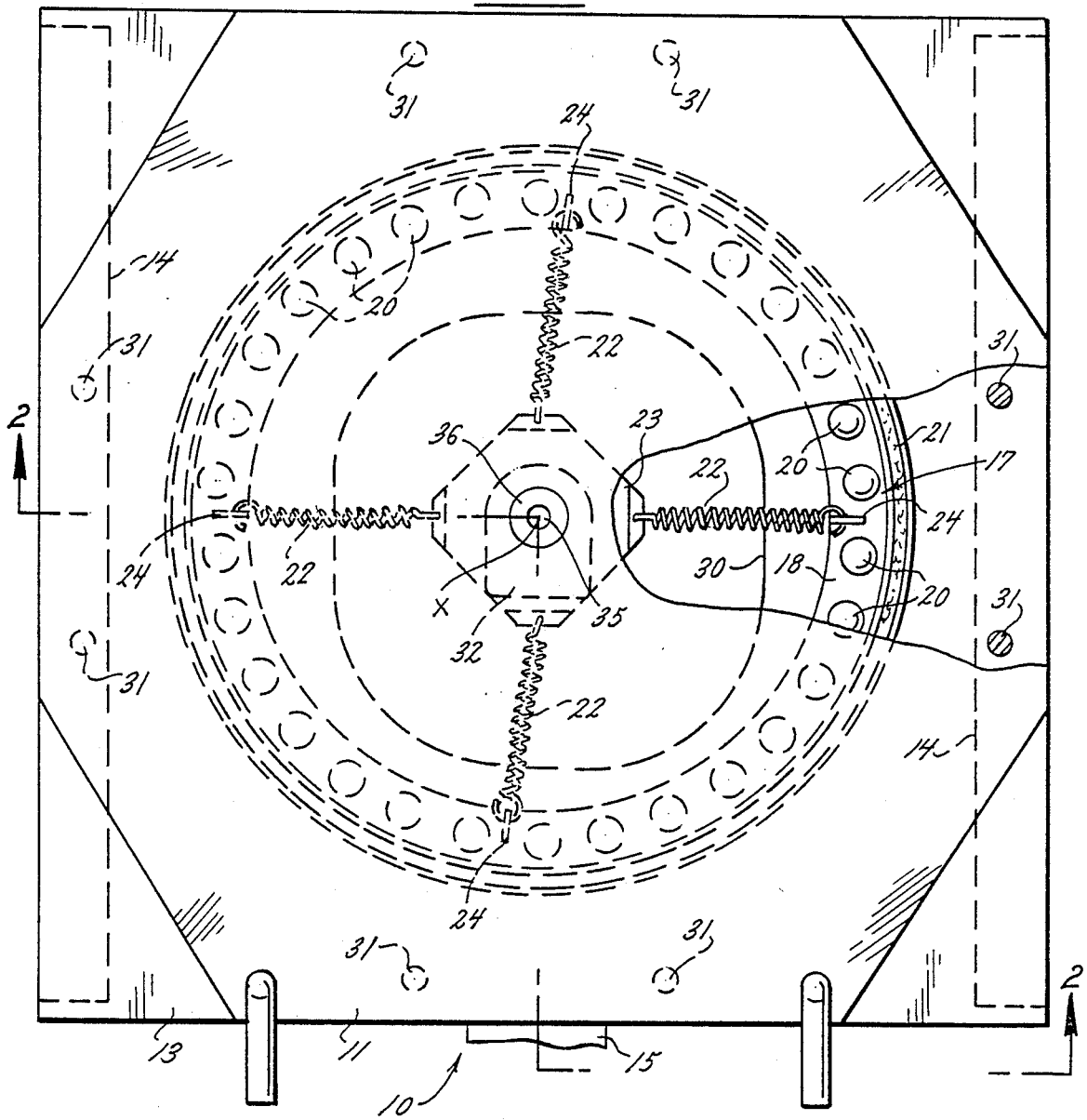
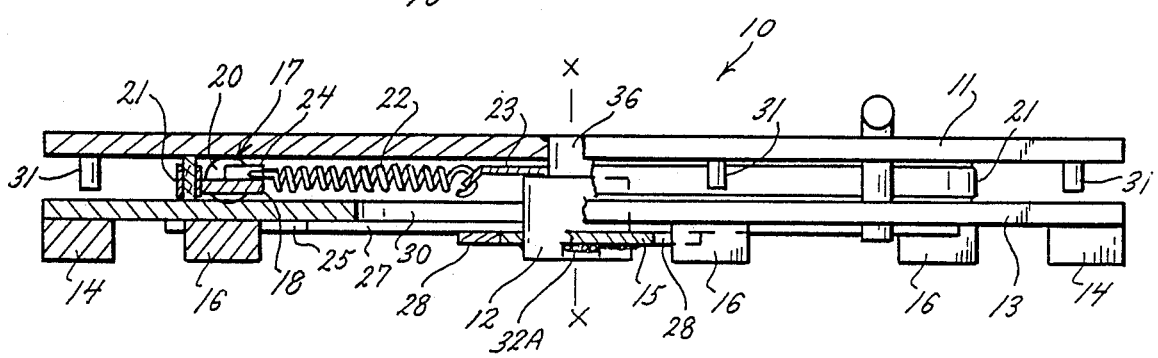

VEHICLE WHEEL TURNING ANGLE GAUGE

BACKGROUND OF THE INVENTION

1. Field of the Invention

This invention is directed to vehicle wheel alignment apparatus, and more particularly to the provision of an improved turning angle gauge for determining the magnitude and direction of wheel turn during the wheel alignment procedure.

2. Description of the Prior Art

The common turning angle gauge, of the character seen in HUNTER Bulletin, Form 900T-4 of October 1976, has a mechanical tracking mechanism in the base which includes a pointer which moves over a circular scale mounted in a position readily seen. A vehicle wheel alignment turn is performed, the gauge is caused to move in an X-Y direction to cause the scale and pointer to cooperate to display the degrees of turn scribed on the scale.

The problem with the mechanical turning angle gauges is that it requires an eyeball interpretation of the pointer position relative to the scale. There is also the problem of the fineness of the scale divisions, and how the scale is able to track the wheel turn and keep its desired alignment relative to the pointer.

It is known that U.S. Pat. No. 4,394,798 of July 26, 1983 is a turning gauge equipped with electronic pickup. The problem with such a gauge is that a belt drive potentiometer is employed, the repeatability of the belt drive is not free of inaccuracies after a period of use, and there are a number of parts which can introduce errors.

BRIEF SUMMARY OF THE INVENTION

The present invention is an improvement in respect of accuracy of results over the visual gauges of the prior art. It also eliminates error prone drive means, with the result that results improve over scale and pointer means or belt connected angle turn indicating devices.

A preferred turning angle gauge embodies an optical shaft encoder for tracking wheel turns in which the shaft of an encoder for tracking wheel turns is connected directly to the means which defines the rotational axis of a wheel in contact with the top plate, and such a device is able to translate with the top plate, but without rotation, to improve on the accuracy and ease with which alignment data can be obtained.

This invention replaces the heretofore common visual reading devices, and employs a direct read-out on a digital display. An optical shaft encoder is mounted on the mechanical tracking mechanism in the turning angle gauge, while the shaft of the encoder is connected directly to a part that represents the axis of rotation of the top member of the turning angle guage. This eliminates inaccuracies experienced with belt drives found in prior turning angle gauges. The encoder body being mounted on the tracking mechanism will not rotate, but will only translate in X-Y motion with the top member to accurately measure the rotation of the top member. The encoder means is held against rotation by means which cooperates with the cup to prevent rotation.

An important object of the invention is to provide a vehicle wheel turnplate with a non-contacting direct rotary to digital encoder having a code wheel which rotates between a LED light source and a series of precisely spaced detectors to produce quadrature square waves which can be electronically decoded to indicate the direction and magnitude of the rotation of the code wheel which represents the turnplate angle. An optical encoder is free of the non-linearity and contact wear problems associated with potentiometers, which are used in current designs.

An important object of the invention is to employ an optical shaft encoder to provide an angular readout accuracy of significantly better accuracy than visual readings provided by the prior art turnplate device equipped with a scale and pointer combination.

BRIEF DESCRIPTION OF THE DRAWINGS

The turnplate with electronic turning angle gauge is illustrated in the following drawings, wherein:

FIG. 1 is a top plan view of the turnplate;

FIG. 2 is a fragmentary sectional view taken along line 2—2 in FIG 1;

DETAILED DESCRIPTION OF THE EMBODIMENT

Figure 3:
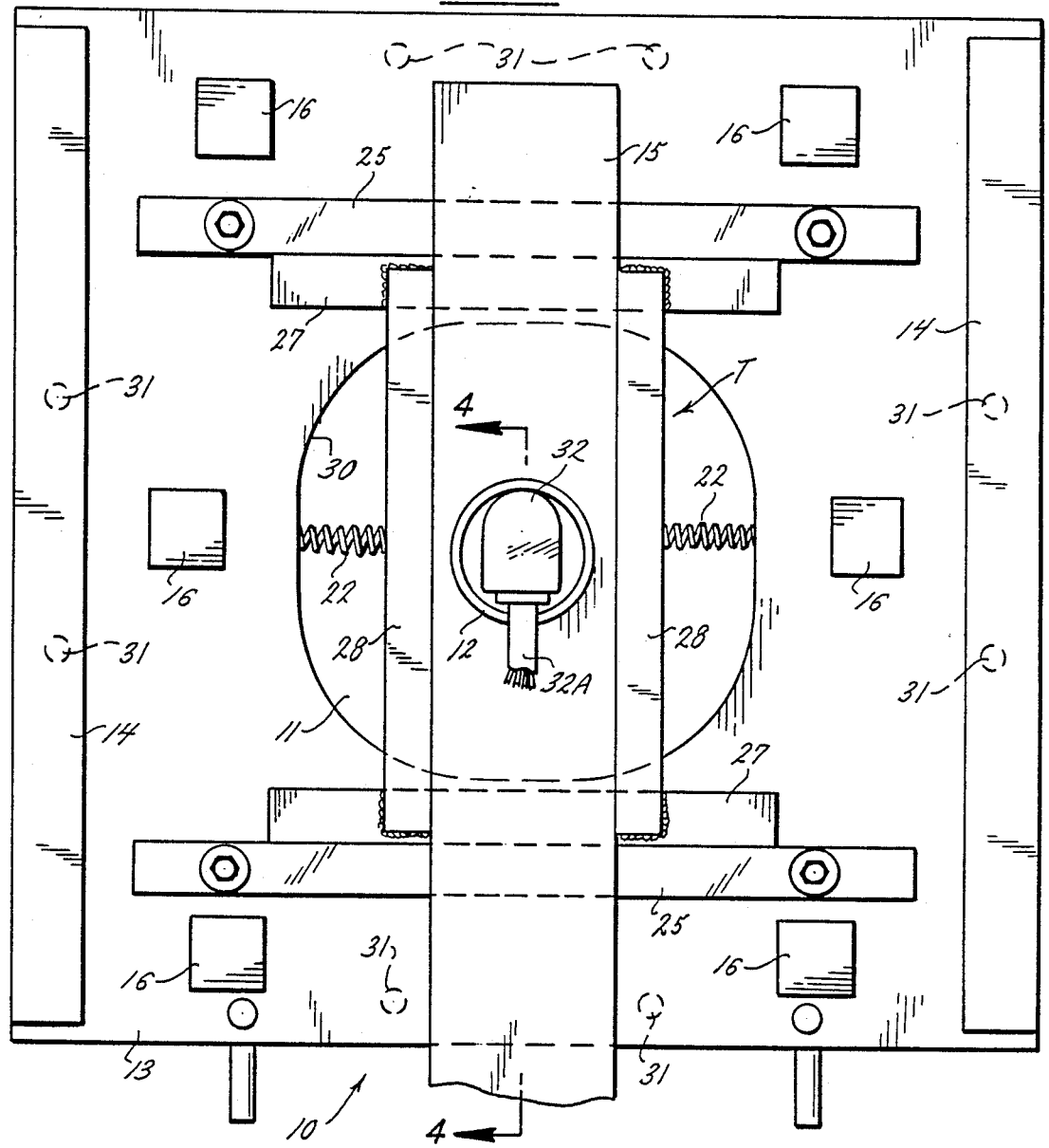
FIG. 3 is a view looking up from the under side of the turnplate seen in FIG. 1.

An enabling embodiment is seen in FIG. 1 which is a top plan view of the turnplate assembly 10. The vehicle wheel supporting plate 11 is adapted to rotate about the axis XX which is established by the cup element 12 carried by the wheel contact plate 11. The base plate 13 is provided with elongated foot pads 14 directed along opposite sides of the base plate 13 and oriented to be parallel to an elongated bar 15 (FIG. 3). There are a plurality of small support feet 16 arranged about the under surface of the base plate 13.

Between the top plate 11 and base plate 13 there is arranged a ball bearing assembly 17 comprised of an annular ball retaining ring 18 formed with tapered apertures 19 to receive a series of bearing balls 20 which support and spaced the top plate 11 from the base plate 13. The bearing assembly 17 is enclosed by a dirt excluding ring 21. The ball retaining ring 18 is centered on the axis XX by four springs 22 set at 90° spacing and anchored at the inner ends in a center spring retainer ring 23 and anchored on the ring 18 at keepers 24 (See FIGS. 2 and 4).

Looking at FIG. 3, the underside of the base plate 13 carries spaced and parallel fixed guide bars 25 directed at 90° to the foot pads 14. The bars 25 serve to guide the movement of a rectilinear tracking assembly T composed of slide bars 27 which engage and slide relative to the fixed guide bars 25. In turn, the slide bars 27 carry a second pair of guide bars 28 which span the distance between slide bars 27 and are fixed at the respective ends to the bars 27. The second pair of bars 28 are spaced apart to receive the elongated bar 15 which is free to slide in directions parallel to the second bars 28. The tracking assembly is operably located under the base plate 13.

Figure 4:
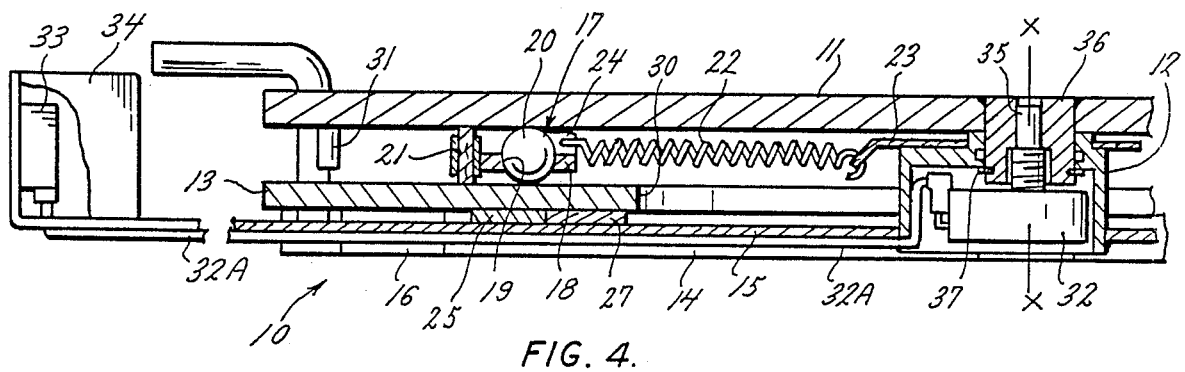
FIG. 4 is a fragmentary sectional view taken along the line 4—4 in FIG. 3.

It is seen in FIGS. 3 and 4 that the central area of the base plate 13 is cut away to form a window opening defined by the margin 30. This opening allows the cup element 12, carried by the top contact plate 11, to penetrate into that opening so as to restrict the movement of the cup element 12 to any positions where the element 12 abuts on the margin of the window 30. Thus, the top plate 11 is able to move in the direction parallel to the bar 15 and carry with it the cup 12 until the cup abuts the margin of the window 30. Also, the top plate 11 can move in a direction parallel to the guide bars 25 by sliding the bars 27 along the bars 25 until the cup element 12 again abuts the margin of the window 30. Likewise, the plate 11 can move in angular directions to those already identified, and in those directions the motion is limited by the margin of the window 30.

The top plate 11 has the ability to move in any direction within the limits of the opening defined by the margin 30, and in so moving the plate 11 is able to turn or rotate about the axis XX as required by the angular degree of turn of the vehicle wheel. Furthermore, as the top plate 11 moves relative to the base plate 13, the dirt excluding ring 21 will also move due to the pull of the spring 22 endeavoring to keep that ring centered to the axis XX. However, the ring 21 is prevented from moving out beyond its position between the plates 11 and 13 by a series of spaced retaining pins 31 carried on the underside of the top plate 11 (See FIG. 2).

The rotating function of the top plate 11 is monitored by the means of a rotary encoder device 32 disposed within the cup element 12 (FIGS. 3 and 4). The encoder device 32 is retained from rotating by the means 32B, which may consist of a body of pliable material, (See FIG. 6) which fits in the space between the body of device 32 and the cup element 12 to prevent rotation. That encoder device 32 may be the same as or the equivalent of a U.S. Digital SOFTPOT optical shaft encoder, identified as a series SP500 or SP500B, noncontacting direct rotary to digital converter. Such an encoder device eliminates wear, contact bounce and digit bobble associated with pots and analog/digital converters. The encoder device 32 has a multiple lead cable 32A (FIG. 4) which is directed along beneath the bar 15 and emerges in a protective receptacle 33 positioned in an electrical junction fixture 34 which houses the receptacle 33 for receiving plug-in type cables for transmitting the signal from the encoder device 32 which has produced the signal to a suitable display. As seen in FIG. 4, the typical encoder device 32 is shown to have a projecting shaft 35 engaged in a bushing 36 fixed in the top plate 11 by welding. The bushing 36 supports the stationary (non-rotary) cup 12 by the shaft 35 and is held by a snap ring 37. Rotation of the top plate 11 drives the shaft 35 to actuate the encoder 32. However, the encoder device 32 is prevented from rotating by the means 32B.

Figure 5:
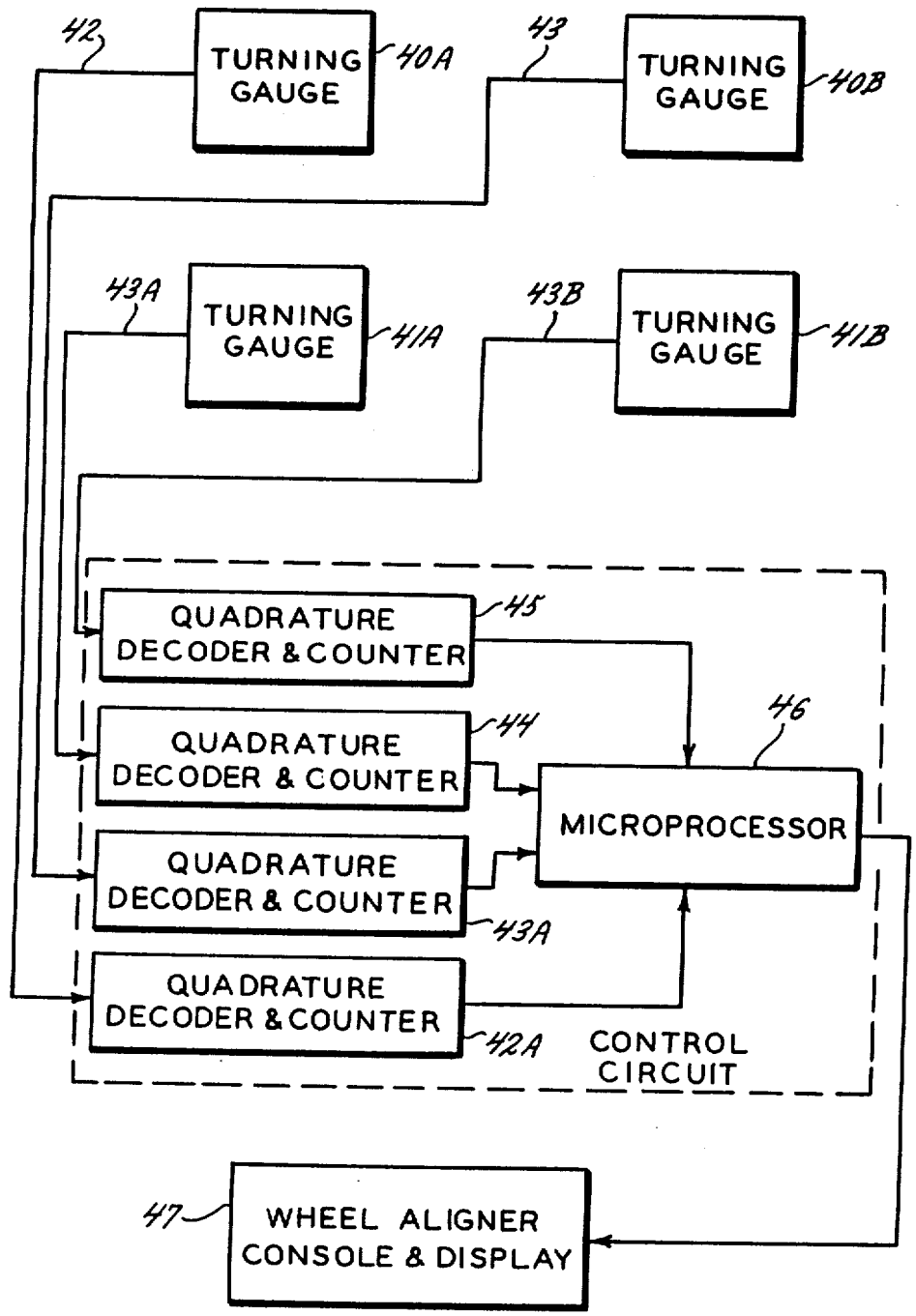
FIG. 5 is a block diagram of the turnplate shaft encoder and associated control circuit and computerized alignment display.

Turning now to FIG. 5, there is shown a block diagram of a control circuit and computerized wheel alignment display processor. The control circuit has been enlarged to illustrate an arrangement of an ultimate system housing electronic turning angle gauges 40A and 40B for the steerable front wheels, and a pair of turning angle gauges 41A and 41B for steerable or other type of rear wheels. The latter pair of angle gauges are not necessary for vehicles with non-steerable rear wheels.

The angle gauge 40A has its circuit lead 42 connected into a suitable quadrature decoder and counter seen at 42A. A similar angle gauge 40B has its circuit lead 43 connected into a second suitable quadrature decoder and counter 43A. If the vehicle has steerable rear wheels, then additional angle gauges 41A and 41B are hooked into the system by circuit leads 43A and 43B connected respectively into guadrature decoders and counters 44 and 45. The respective quadrature decoders and counters 42A and 43A, and 44 and 45, if needed, are connected into a common microprocessor 46 which assembles and sends that information into the wheel aligner apparatus and display seen at 47.

What is claimed is:

1. In a vehicle wheel turning angle gauge, the combination comprising:
    (a) a stationary base plate and a superimposed vehicle wheel contact plate maintained in spaced relation by a bearing assembly permitting the contact plate to move in linear and angular directions relative to said stationary base plate;
    (b) a tracking assembly movably positioned on said base plate, said base plate having a window opening to permit a view of the underside of said contact plate;
    (c) an optical shaft encoder device operably movable with said wheel contact plate within said base plate window, a rotational responsive connection with said contact plate to follow the angular turning response imparted to said contact plate by a vehicle wheel in contact with said contact plate, said encoding device developing a signal output for determining the magnitude and the direction of rotation of said contact plate relative to said base plate;
    (d) protective enclosure is mounted at the underside of said contact plate and is formed with an open bottom to receive said optical shaft encoder device; and a body of pliable material is applied to said protective enclosure for encapsulating and retaining said encoder device against rotation relative to said protective enclosure; and
    (e) signal processing means connected to said encoder device for displaying said magnitude and direction of rotation of said wheel contact plate.

2. In a vehicle wheel turning angle gauge having a stationary base and a superimposed vehicle wheel contact plate maintained in spaced relation from the stationary base by a bearing assembly permitting the wheel contact plate to rotate about a center and also move in linear and angular directions relative to the stationary base, the improvement therein of:
    (a) a tracking assembly movably positioned on said base plate, said base plate having a window opening to permit a view of the underside of said contact plate, said tracking assembly including,
        (1) a rotary encoder device attached to the wheel contact plate in said window a projecting shaft fixedly engaged in the center of rotation of the wheel contact plate, the projecting shaft having rotary movement to follow the wheel contact plate directional rotation, and
        (2) electrical cable means extending from said rotary encoder device to transmit information on the magnitude and direction of rotation of the wheel contact plate; and
    (b) information processing means connected to said cable means for displaying the information transmitted from said encoder device.

* * * * *

UNITED STATES PATENT AND TRADEMARK OFFICE
CERTIFICATE OF CORRECTION

PATENT NO. : 4,897,926

DATED : 2/6/90

INVENTOR(S) : Altnether et al

Figure 6:
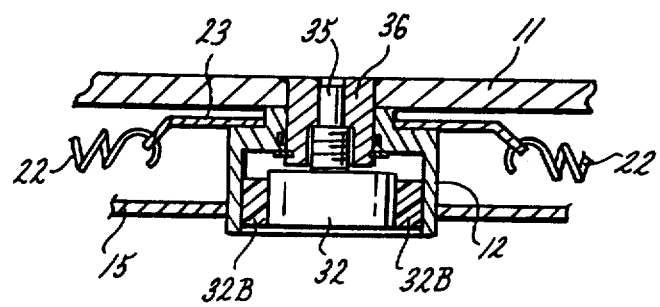
FIG. 6 is a fragmentary sectional view taken along line 6—6 in FIG. 3 to show the placement of means to retain the encoder means against rotation.
Figure 3:
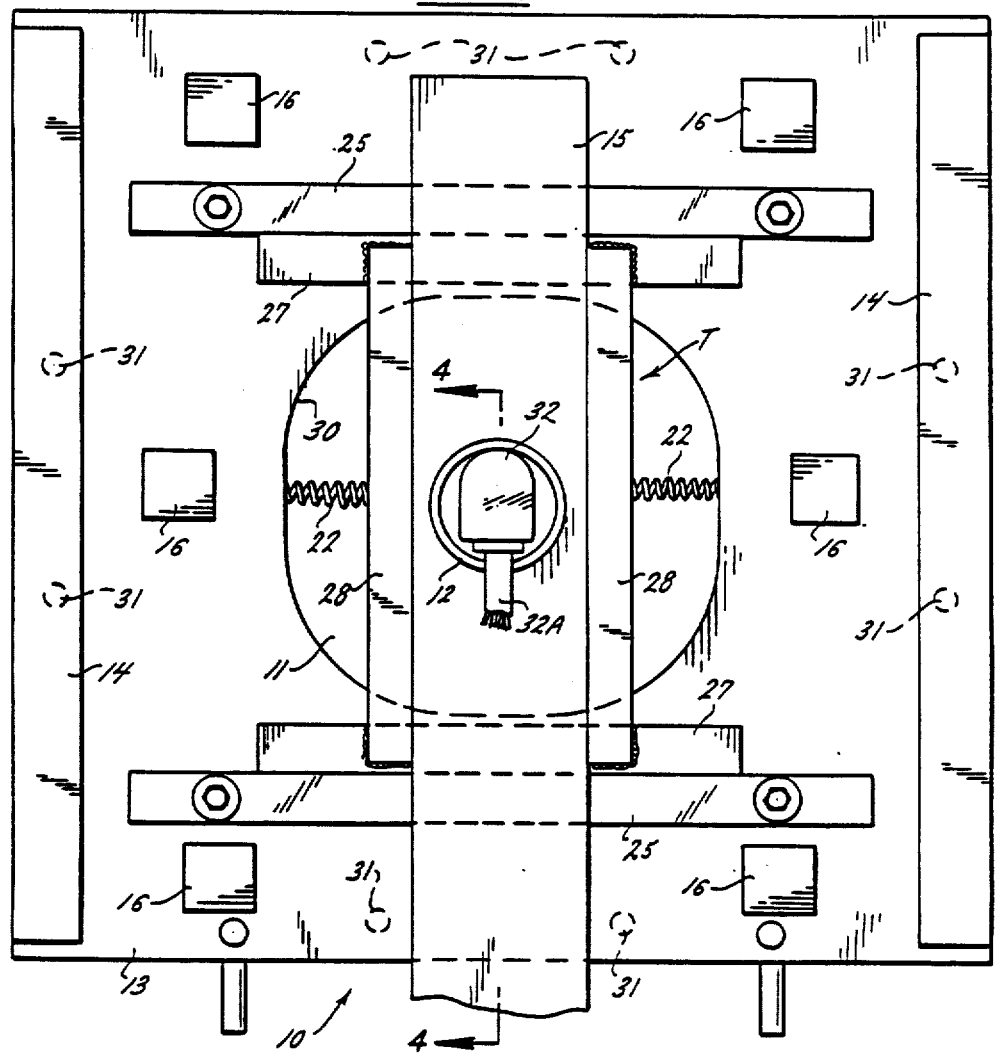
Figure 4:
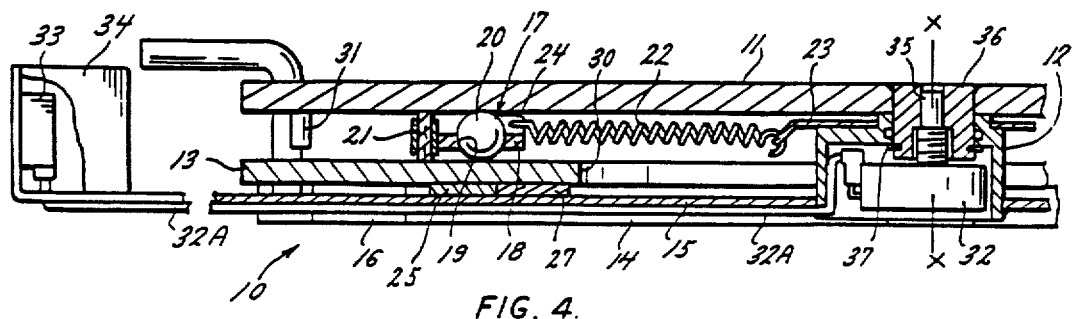
Figure 5:
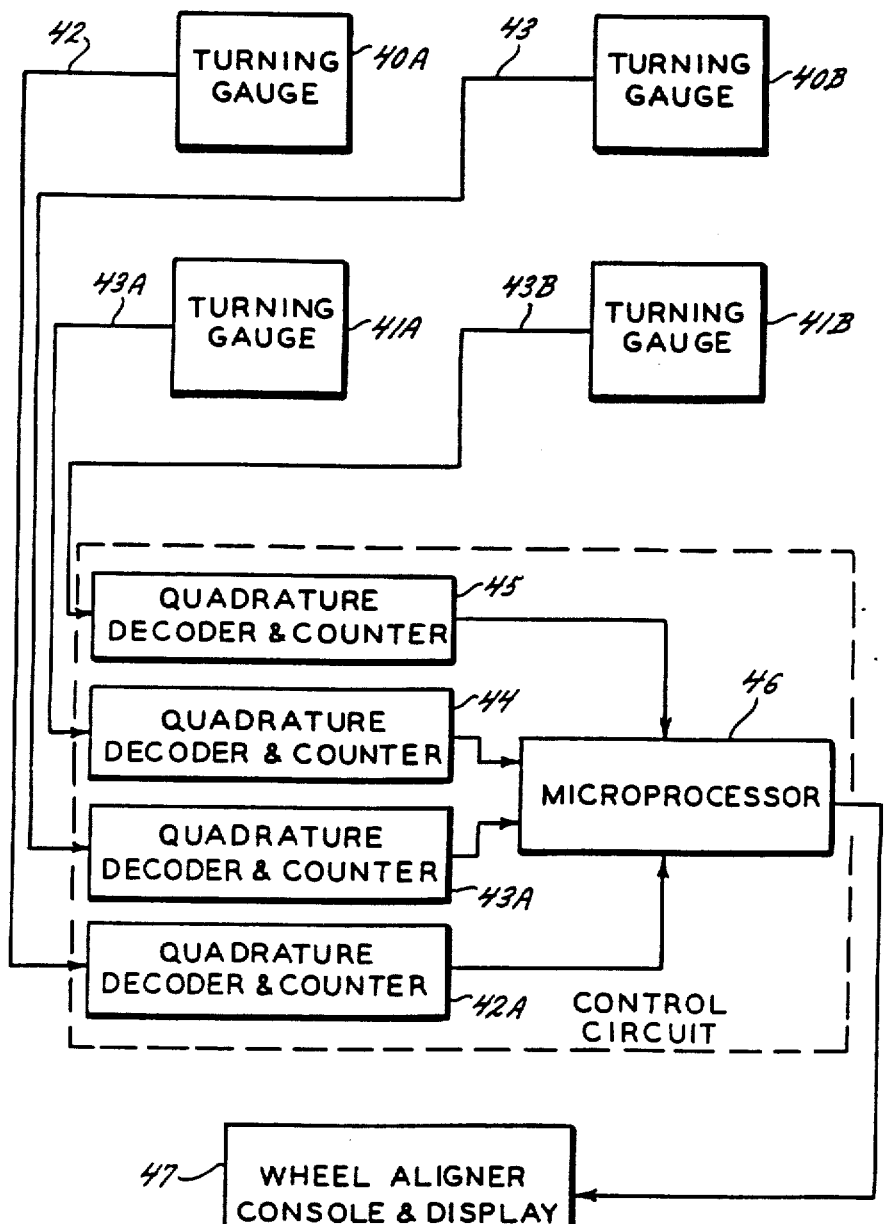
Figure 6:
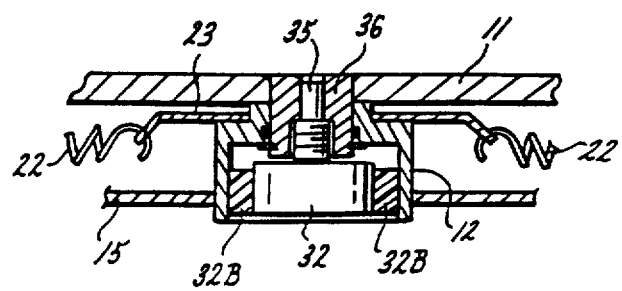

It is certified that error appears in the above-identified patent and that said Letters Patent is hereby corrected as shown below:

The sheet of drawings consisting of Figs. 5 and 6, should be added as shown on the attached page.
Sheet 1 of 2 of the drawings should read -- 1 of 3 --
Sheet 2 of 2 of the drawings should read -- 2 of 2 --
Sheet 3 of 3 of the drawings should be added as per attached sheet.

Signed and Sealed this

First Day of December, 1992

Attest:

DOUGLAS B. COMER

Attesting Officer

Acting Commissioner of Patents and Trademarks

UNITED STATES PATENT AND TRADEMARK OFFICE
CERTIFICATE OF CORRECTION

PATENT NO. : 4,897,926

DATED : 2/6/90

INVENTOR(S) : Altnether et al

It is certified that error appears in the above-identified patent and that said Letters Patent is hereby corrected as shown below:

The sheet of drawings consisting of Figs. 5 and 6, should be added as shown on the attached page.
Sheet 1 of 2 of the drawings should read -- 1 of 3--
Sheet 2 of 2 of the drawings should read -- 2 of 2--
Sheet 3 of 3 of the drawings should be added as per attached sheet.

This certificate supersedes Certificate of correction issued December 1, 1992.

Signed and Sealed this

Ninth Day of March, 1993

Attest:

STEPHEN G. KUNIN

Attesting Officer

Acting Commissioner of Patents and Trademarks